US005712542A

United States Patent [19]

Stutz et al.

[11] Patent Number: 5,712,542

[45] Date of Patent: Jan. 27, 1998

[54] POSTAGE METER WITH IMPROVED HANDLING OF POWER FAILURE

[75] Inventors: Peter Stutz, Hinterkappelen; Martin Müller, Langenthal; Andre Flückiger, Bern, all of Switzerland

[73] Assignee: Ascom Hasler Mailing Systems AG, Bern, Switzerland

[21] Appl. No.: 562,854

[22] Filed: Nov. 27, 1995

Related U.S. Application Data

[63] Continuation-in-part of Ser. No. 450,129, May 25, 1995.

[51] Int. Cl.[6] .......... H02P 5/46

[52] U.S. Cl. .......... 318/66; 318/567; 318/445; 318/569; 364/918.52; 364/464.02

[58] Field of Search .......... 318/66, 567, 569, 318/445; 364/918.52, 918.2, 464, 464.02, 464.03, 406, 225.1

[56] References Cited

U.S. PATENT DOCUMENTS

| | | | |
|---|---|---|---|
| 3,938,095 | 2/1976 | Check, Jr. et al. | 340/172.5 |
| 4,268,817 | 5/1981 | Simjian | 364/464.02 X |
| 4,280,580 | 7/1981 | Wojcik | 180/169 |
| 4,306,299 | 12/1981 | Check, Jr. et al. | 364/900 |
| 4,323,987 | 4/1982 | Holtz et al. | 365/229 |
| 4,547,853 | 10/1985 | Eckert | 364/464 |
| 4,611,282 | 9/1986 | McFiggans | 363/464.02 X |
| 4,675,841 | 6/1987 | Check, Jr. et al. | 364/900 |
| 4,701,856 | 10/1987 | DiGiulio et al. | 364/466 |
| 4,746,818 | 5/1988 | Hafner | 307/363 |
| 4,747,057 | 5/1988 | DiGiulio et al. | 364/464 |
| 4,962,459 | 10/1990 | Mallozzi et al. | 364/464.02 |
| 5,278,541 | 1/1994 | Wicht et al. | 340/636 |
| 5,495,103 | 2/1996 | Utiger et al. | 250/222.1 |
| 5,526,271 | 6/1996 | Abumehdi | 364/464.02 |
| 5,535,126 | 7/1996 | Mourgues | 364/464.02 X |

FOREIGN PATENT DOCUMENTS

| | | |
|---|---|---|
| 0075825 | 4/1983 | European Pat. Off. . |
| 0197345 | 10/1986 | European Pat. Off. . |
| 2062311 | 5/1981 | United Kingdom . |

*Primary Examiner*—Karen Masih
*Attorney, Agent, or Firm*—Oppedahl & Larson

[57] ABSTRACT

A postage meter has a print rotor rotated by a motor and the motor is capable of being started and stopped under processor control. State variables are established within a nonvolatile memory. The rotor begins in its home position. When a mail piece such as a letter is detected by a letter sensor, the processor sets a state variable. At some point (either before loss of power, or after restoration of power) the postage value to be printed is booked into the accounting register. The rotor motor is started. At some point (either before loss of power, or after restoration of power) the rotor reaches its home position again. A state variable is cleared. In this way, it is possible, even after the loss and restoration of power, to distinguish between a rotor that is in its home position because it has not yet printed postage (but needs to do so) and a rotor that is in its home position because the printing of postage has been completed. Similarly it is possible, even after the loss and restoration of power, to distinguish between accounting registers that are quiescent because they have not yet had a postage amount booked, and registers that are quiescent because the booking of postage has been completed. The postage meter is thus quite unlikely to print postage that has not been booked, or book postage that does not get printed, even in the face of power losses at unpredictable times, and even in the absence of a large-capacity reserve power supply.

5 Claims, 8 Drawing Sheets

| | CONDITION | (402) BOOKING NOT DONE | (403) BOOKING NOT CONFIRMED | (50) ROTOR HOME | |
|---|---|---|---|---|---|
| 1. | IDLE | F | F | T | LETTER SENSOR INTERRUPT (200) |
| 2. | BOOKING HASN'T BEEN STARTED | F | F | T | START BOOKING (404) |
| 3. | BOOKING IN PROGRESS | T | T | T | START MOTOR (353) |
| 4. | ROTOR IS NOT HOME | F | T | F | ROTOR REACHES HOME (50) |
| 5. | ROTOR IS IN BASE POSITION | F | T | T | RESET FLAG |
| 6. | IDLE | F | F | T | |

FIG. 12

POSTAGE METER WITH IMPROVED HANDLING OF POWER FAILURE

This application is a continuation-in-part of application Ser. No. 08/450,129, filed on May 25, 1995, which application is incorporated herein by reference.

The invention relates generally to postage machines (also called franking machines) and relates particularly to improved techniques for handling the condition of power failure during a franking (postage printing) cycle.

BACKGROUND

A postage meter, by definition, has a means for printing postage and a register that accounts for postage being printed. In some countries the register is a descending register representing prepaid postage value. When the descending register is depleted the meter does not permit printing of postage. In other countries the register is an ascending register representing postage that has been printed. The postal customer is expected to remit funds to the postal authorities based on readings from the ascending register. The term "accounting register" is intended to refer to such registers.

It is, of course, an important design goal to reduce to an absolute minimum the discrepancy (if any) between what is stored in the register and what has actually been printed. Error in either direction is unacceptable. If the meter prints postage and the register fails to account for the postage, then the postal authorities will have been cheated out of revenue to which they are entitled. If the meter errs in the other direction the customer has lost money.

One area of concern, in the design of a postage meter, is whether loss of electrical power at an inopportune moment could result in an error in either direction. There is always the possibility of loss of electrical power, whether due to human error in unplugging the meter or tripping over the power cord, or due to an area-wide loss of power in bad weather. Furthermore, the postal authorities are concerned about the possibility, however remote, that a would-be wrongdoer might try repeatedly initiating postage printing cycles and cutting power during the cycles, in the hopes of gaining some opportunity to tamper with the meter or otherwise cheat the postal authorities.

The traditional mechanical postage meter is essentially unaffected by loss of electrical power. In a mechanical postage meter the ascending and/or descending registers, which respectively record the cumulative postage printed and the amount of stored postage remaining to be printed, are mechanical geared registers. The mechanical positions of the register gears are unaffected by loss and restoration of electric power. The linkage between the printing means of the meter and the registers is a purely mechanical linkage, and that linkage is similarly unaffected by loss of electric power. For example, if the printing means in the pure mechanical postage meter is a print rotor, then the linkage is a purely mechanical linkage which translates the rotation of the print rotor into an updating of the mechanical registers. If the rotor rotates, then postage has been printed and the registers will necessarily be updated. If the rotor does not rotate, then postage has not been printed and the registers will not be updated.

The advent of the microprocessor prompted makers of postage meters to replace the function of the purely mechanical meter and to add features to the meters. It is unsurprising, then, that the accounting registers, such as the ascending and/or descending registers, are implemented in electronic memory rather than mechanical memory. Generally, nonvolatile memories are used.

The design decision to use a microprocessor and electronic memories is a natural one, given the numerous advantages that come from the use of a microprocessor. Features are easier to add, modifications are often easier to make, and the parts count is smaller, in comparison to a traditional pure mechanical postage meter. But not everything in a mechanical postage meter can be replaced with silicon; the printing means (typically a print rotor) is necessarily mechanical even if the rest of the postage meter is electronic. But the decision to use memories that are electronic, and a printing means that is mechanical, raises understandable concerns. What happens if the printing process has begun and then electrical power is lost? Are there failure modes or failure sequences that could result in postage 20 being printed without being accounted for? Are there failure modes that could result in the user being charged for postage even though it has not been printed? Can a determined and knowledgeable wrongdoer cause the printing means to print postage under circumstances in which the accounting memories fail to be updated accordingly?

The postage meter art is filled with approaches to this problem.

U.S. Pat. No. 4,306,299 discusses a postage meter system in which the accounting information is kept in volatile memory (memory that would lose its contents upon loss of power) until a power monitor has detected that loss of power is imminent, at which time the contents of the volatile memory are transferred into nonvolatile memory. A very large electrolytic capacitor (75,000 μF, FIG. 14b, item 171) is provided. A circuit monitors the incoming power and when the power drops below some threshold, the processor (under control of its stored program) responds (see. FIG. 20, box 303). The processor transfers its important information into nonvolatile memory (FIG. 23) and enters an endless loop (FIG. 23, box 336). It remains in the endless loop indefinitely. The size of the electrolytic capacitor is chosen to guarantee at least 20 ms (col. 18, line 61) for the transfer. When postage is printed in the meter of U.S. Pat. No. 4,306,299, it occurs (apparently) because a mail piece has entered the meter and has triggered the print rotor to rotate. The rotation of the rotor is sensed in software when a photocell 99 (FIG. 3) detects a slot in a disk mounted on the rotor shaft. A routine of FIG. 30 updates the accounting register in volatile memory to account for postage printed. Some mechanism, apparently undisclosed in U.S. Pat. No. 4,306,299, causes the print rotor to rotate one time in response to some sort of mechanical trigger, also apparently undisclosed in the patent. Perhaps a single-revolution clutch gives rise to one full revolution of the print rotor.

In the disclosure of U.S. Pat. No. 4,306,299, little is said about what would happen if power were to fail at various points in a postage printing cycle. For example if power were to fail before the slot reaches the photocell but after a print cycle has begun, one can only speculate whether the processor might never learn that the printing cycle took place. If power were to fail after the slot reaches the photocell but before the print cycle has finished, one can only speculate whether the customer will be charged even though perhaps the print cycle never finished.

In such prior-art postage meters it is common practice to provide a backup or secondary source of electric power for the processor and related electronics, with the design goal of providing such power for a time interval that is long enough to permit the processor to do everything necessary to record and fully account for the postage value that is printed, or is to be printed. But numerous factors conspire to make such a meter a less than adequate solution to the problem.

For example, it is probably simplistic to design only for the simple case of power being lost and power being restored. In real life it is not unheard of to encounter circumstances that could lead to fluctuating power. The meter might be powered, then unpowered briefly, then powered briefly, through several iterations. This could result, in the case of the meter of U.S. Pat. No. 4,306,299, in overcounting. Suppose the rotor gets stuck in the position in which the slot lines up with the photocell, and suppose that power is lost and restored repeatedly. In this case the question arises whether the software might proceed on the assumption that several franking cycles have occurred.

A second reason why this approach is disfavored is that it requires that reserve power be provided that can be assured to last long enough for the entire procedure of booking the postage to the nonvolatile memory. For example, it is commonplace to use an electrically erasable programmable read-only memory (EEPROM) as a nonvolatile memory. But such memories can only be rewritten a limited number of times. To avoid the problem of relying on a region of memory that has failed due to repeated rewriting, a typical strategy is to have a ring or sequence of memory locations that are written to one after the other. An additional strategy is to keep a table that records which memory locations have failed due to repeated rewriting, and to consult the table in determining where to write the next item of data. Yet a third strategy is to write the postage information, and then read it back to be sure it was written correctly; if the read-back fails then the storage location is marked "bad" and the information is written elsewhere. The result of all this is that the process of booking postage, or making an accounting for the printing of postage, can take an unpredictable amount of time. After all, it might turn out that several memory locations, in succession, cannot be read back successfully.

In the face of all this it is commonplace to set a design goal of providing a reserve power supply (e.g. by a large electrolytic capacitor) that will last tens or even hundreds of milliseconds, to accommodate a postage booking process that may take a non-negligible amount of time to complete. Indeed it is also commonplace to design the reserve power supply to last as long as an entire franking cycle, with the hope of being able to depend on the processor being in a position to monitor the rotor movement for the entire printing cycle. As mentioned above, however, the experienced designer will attempt to deal not only with the simple case of power being lost and restored, but with more complicated situations such as intermittent power loss and partial power loss.

A very different type of secondary power supply for a postage meter is described in U.S. Pat. No. 5,278,541 entitled Enhanced Reliability In Portable Rechargeable Devices, assigned to the same assignee as the assignee of the present application. In that patent, a power supply is described which provides power while a postage meter is taken to a post office for refilling (resetting), together with a way of testing the power supply before the trip to the post office, to be sure that it will last long enough. But the power supply for that system is a fairly large nickel-cadmium battery.

For reasons described above, it is thus highly desirable to provide a postage meter that protects against (1) booking of postage without the postage being printed, and (2) printing of postage without booking of the postage; and that does so without being vulnerable to intermittent power loss or to partial power loss, and without requiring a large power supply.

SUMMARY OF THE INVENTION

A postage meter has a print rotor rotated by a motor and the motor is capable of being started and stopped under processor control. State variables are established within a nonvolatile memory, a first variable associated with the completion of booking of the printing of postage and a second variable associated with the rotation of the print rotor. The rotor begins in its home position. When a mail piece such as a letter is detected by a letter sensor, the processor sets the first variable. The second variable is set. At some point (either before loss of power, or after restoration of power) the postage value to be printed is booked into the accounting register, and the first state variable is cleared. The rotor motor is started. At some point (either before loss of power, or after restoration of power) the rotor reaches its home position again. The second state variable is cleared. In this way, it is possible, even after the loss and restoration of power, to distinguish between a rotor that is in its home position because it has not yet printed postage (but needs to do so) and a rotor that is in its home position because the printing of postage has been completed. Similarly it is possible, even after the loss and restoration of power, to distinguish between accounting registers that are quiescent because they have not yet had a postage amount booked, and registers that are quiescent because the booking of postage has been completed. The postage meter is thus quite unlikely to print postage that has not been booked, or book postage that does not get printed, even in the face of power losses at unpredictable times, and even in the absence of a large-capacity reserve power supply.

DESCRIPTION OF THE DRAWING

The invention will be described with respect to a drawing in several figures, of which:

FIG. 12 is a state diagram showing state variables within the postage meter according to one embodiment of the invention;

DETAILED DESCRIPTION

Figure 1:
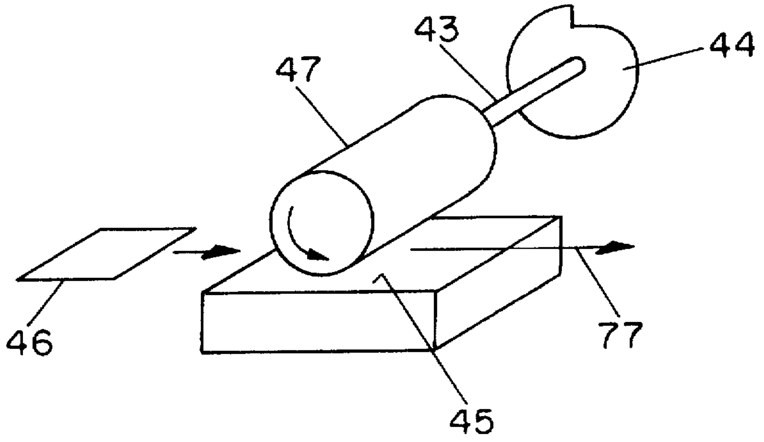
FIG. 1 is a simplified partial view of a postage meter according to the invention.
Figure 2:
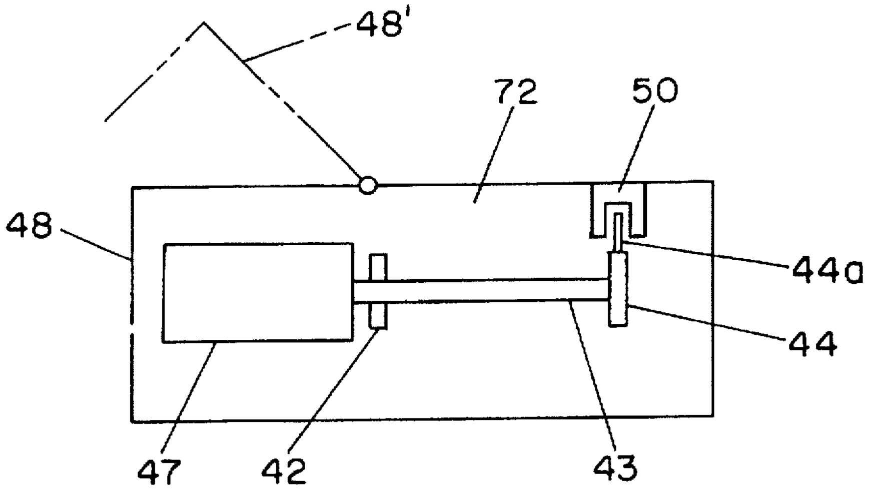
FIG. 2 is a simplified cross-section view of the postage meter of FIG. 1.
Figure 3:
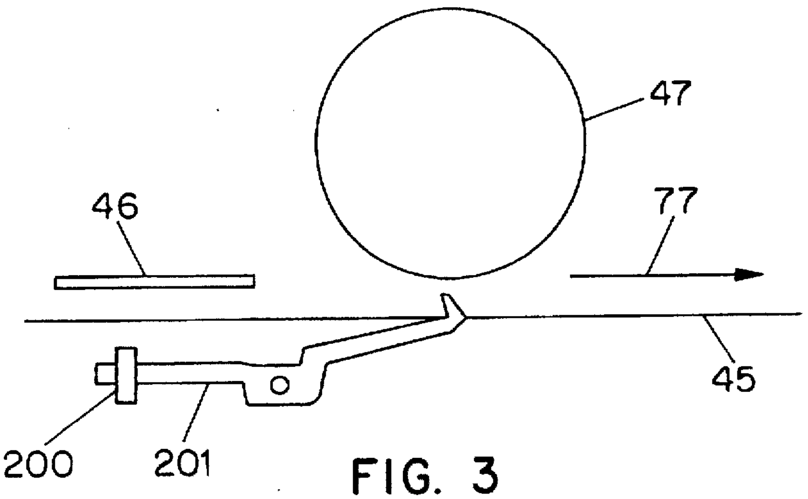
FIG. 3 is a section perpendicular to the section of FIG. 2.

FIG. 1 is a simplified partial view of a postage meter according to the invention. A mail piece 46 follows a paper path 77, between a print rotor 47 and a surface 45. The rotor 47 rotates once for each mail piece. FIG. 2 is a simplified cross-section view of the postage meter of FIG. 1. The rotor 47 may be seen, along with radial cam 44, cam follower 44a, and sensor 50. The rotor 47 is within secure housing 72, in compliance with postal service requirements. FIG. 3 is a section perpendicular to the section of FIG. 2. The mail piece 46 may again be seen, which engages letter lever 201. This changes the output of sensor 200 and starts the franking process.

The letter sensor is preferably that of U.S. application Ser. No. 08/403,461, now U.S. Pat. No. 5,495,103 entitled Postage Meter With Improved Paper Path, assigned to the same assignee as the assignee of the present application, and incorporated herein by reference. Alternatively, the letter sensor could be the optical trigger of U.S. application Ser. No. 08/213,929 entitled Optical Trigger for Postage Meter, assigned to the same assignee as the assignee of the present application, and incorporated herein by reference.

Figure 4:
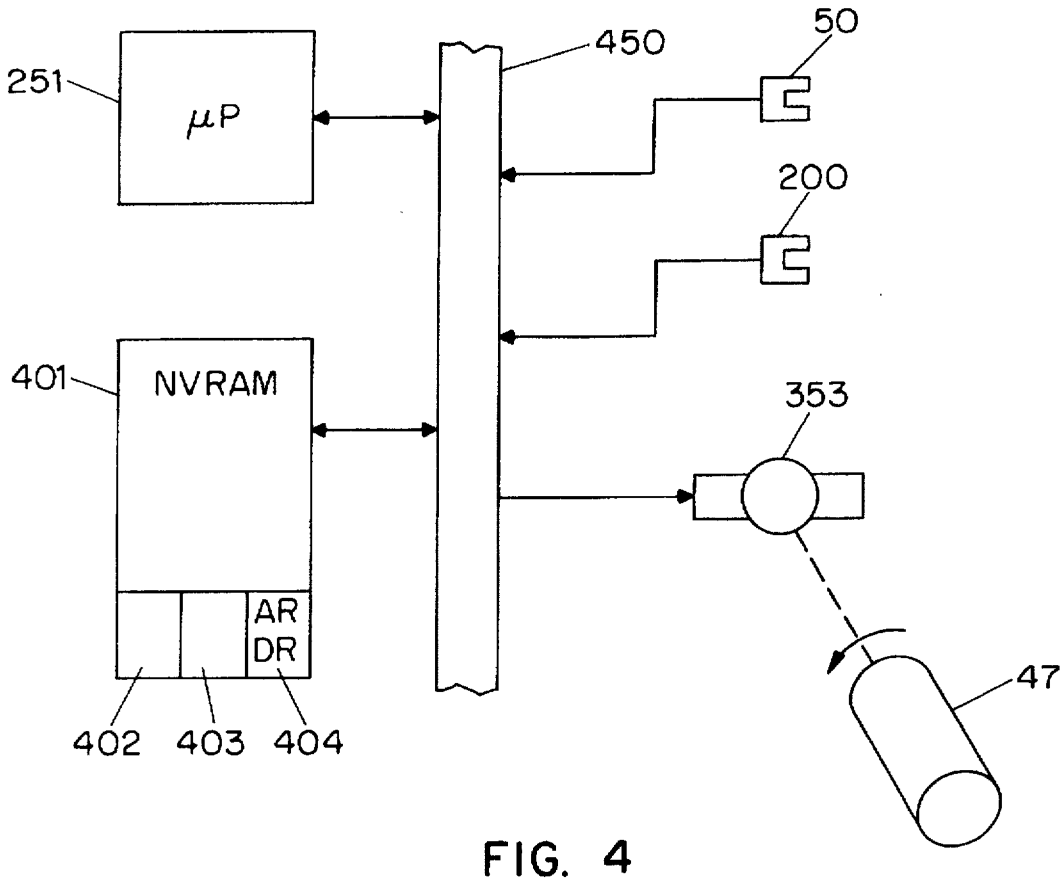
FIG. 4 is a system diagram showing the bus interconnecting the processor and other elements of the postage meter.

FIG. 4 is a system diagram showing the bus interconnecting the processor 251 and other elements of the postage meter. The letter sensor is an LED-phototransistor pair 200, which is an input to the processor 251. The position of the rotor is monitored through an LED-phototransistor pair 50. The processor 251 can start and stop the motor 353, which is mechanically coupled with rotor 47. The processor 251 has a nonvolatile memory 401 which is preferably protected as set forth in a copending patent application entitled *Protection System for Critical Memory Information*, U.S. application Ser. No. 08/422,435, filed Apr. 14, 1995, and assigned to the same assignee as that of the present application, which is incorporated herein by reference. The memory 401 includes storage locations shown as boxes 402, 403, and 404 about which more will be said later.

Figure 5:
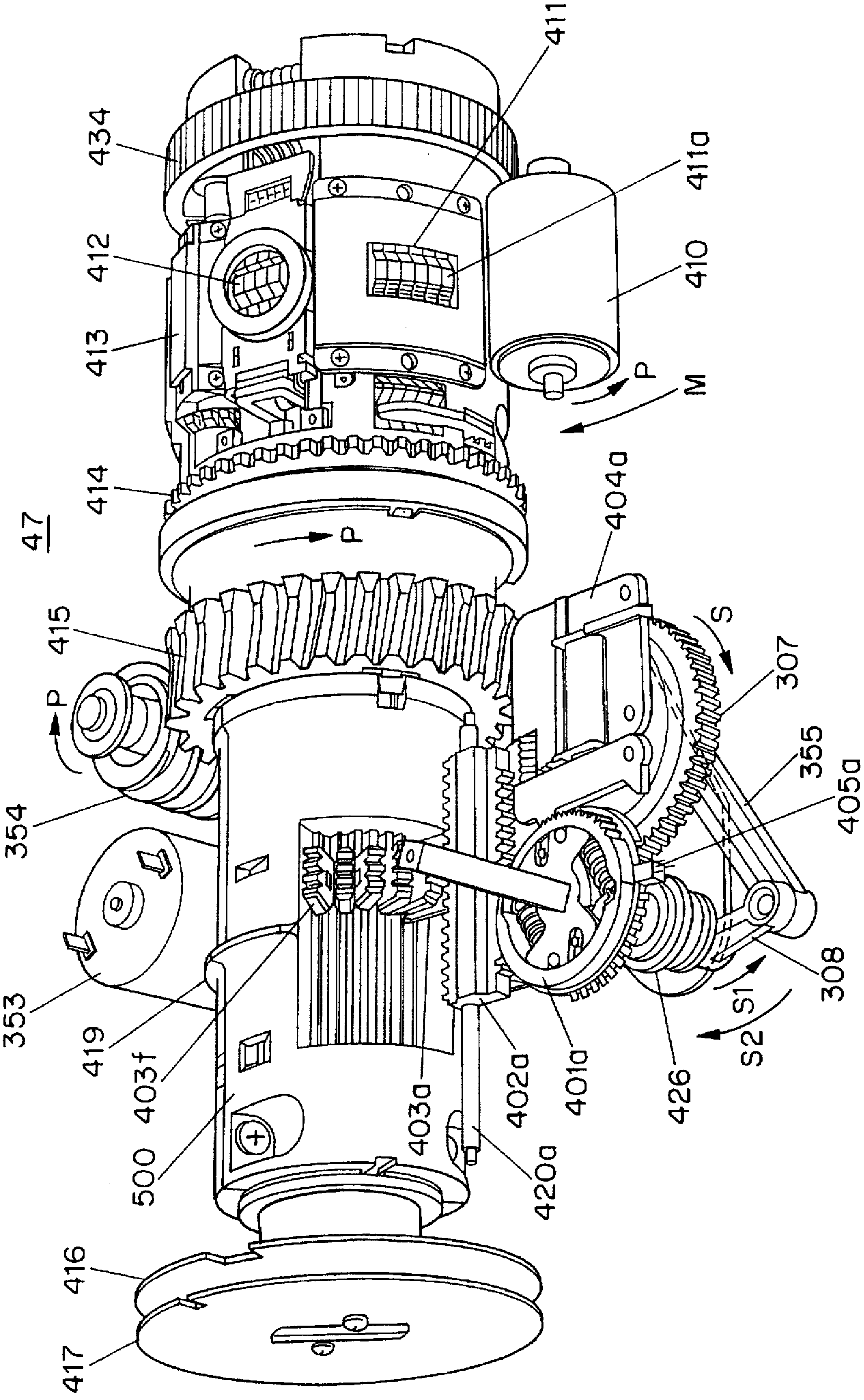
FIG. 5 is a perspective view of a print rotor according to the invention, including a worm wheel and worm gear.

FIG. 5 is a perspective view of a print rotor according to the invention, including a worm wheel 415 and worm gear 354. Motor 353 is geared to worm gear 354. When the motor 353 is started the worm gear 354 rotates, which causes the worm wheel 415 to turn, taking rotor 47 with it. The mechanical linkages are preferably those set forth in a copending patent application entitled Single Motor Setting And Printing Postage Meter, U.S. application Ser. No. 08/422,155, filed Apr. 14, 1995, and assigned to the same assignee as that of the present application, which is incorporated herein by reference. Date wheels in the postage meter are preferably set as described in a copending patent application entitled System For Setting Date Wheels In A Postage Meter, U.S. application Ser. No. 08/421,902, filed Apr. 14, 1995, and assigned to the same assignee as that of the present application, which is incorporated herein by reference. The rotor axle is preferably hollow, as described in a copending patent application entitled Postage Meter With Hollow Rotor Axle, U.S. application Ser. No. 08/421,900, filed Apr. 14, 1995, and assigned to the same assignee as that of the present application, which is incorporated herein by reference.

Figure 6:
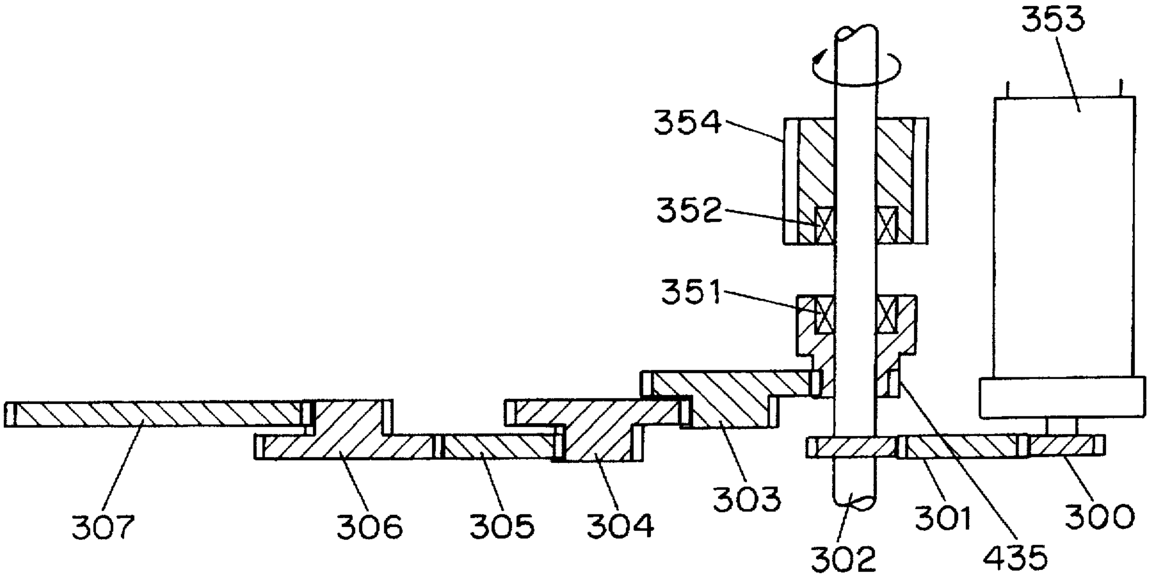
FIG. 6 is a stylized sectional view of the gear train for the mechanical arrangement of FIG. 5, including the worm gear and motor.

FIG. 6 is a stylized sectional view of the gear train for the mechanical arrangement of FIG. 5, including the worm gear 354 and motor 353. The worm gear 354 is preferably connected by a one-way clutch 352, so that rotation of the motor 353 in one direction causes rotation of the print rotor, and rotation of the motor 353 in the other direction causes setting of the settable elements of the rotor 47. This is described in detail in the aforementioned U.S. application Ser. Nos. 08/422,155 and 08/421,902.

Figure 7:
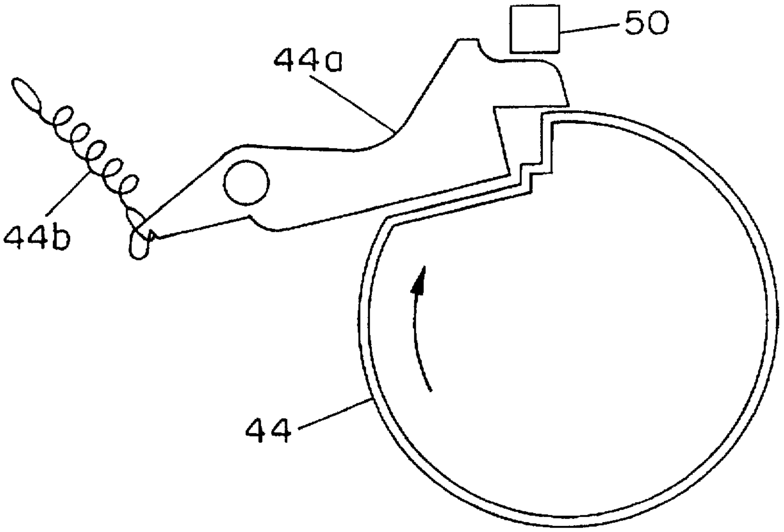
FIGS. 7, 8, and 9 are axial views of a radial cam and sensor.
Figure 8:
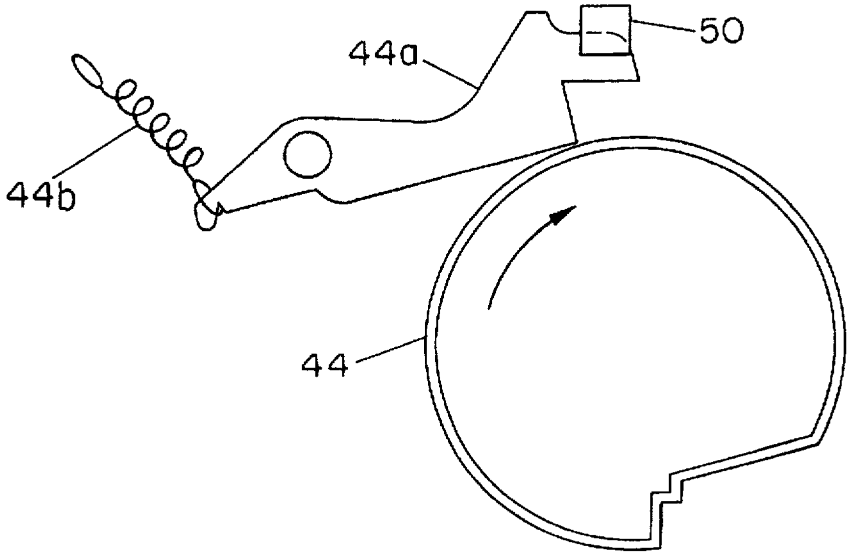
Figure 9:
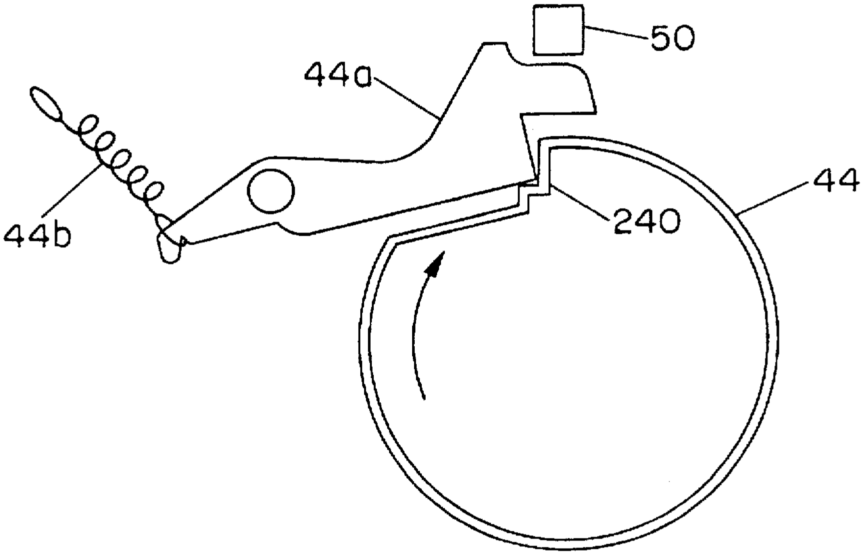

FIGS. 7, 8, and 9 are axial views of a radial cam and sensor, as shown in detail in a copending patent application entitled Postage Meter with Rotor Movement and Die Cover Sensor, U.S. application Ser. No. 08/446,218, filed May 22, 1995, and assigned to the same assignee as that of the present application, which is incorporated herein by reference. When the rotor 47, omitted for clarity in FIGS. 7, 8, and 9, is in its home position, then the follower 44a is down in FIG. 7. Thus light passes in the sensor 50. When the rotor 47 is away from its home position, as in FIG. 8, the follower 44a is up and the light is blocked in the sensor 50. Later the rotor returns to its home position as in FIG. 9 and the sensor 50 again permits light to pass. In this way the processor has unambiguous information about the home or not-home position of the rotor 47, but, as will be appreciated by those skilled in the art, the sensor 50 cannot determine whether or not the rotor's home position represents a rotor that is about to print postage, or whether the home position represents a rotor that has just finished printing postage.

Figure 10:
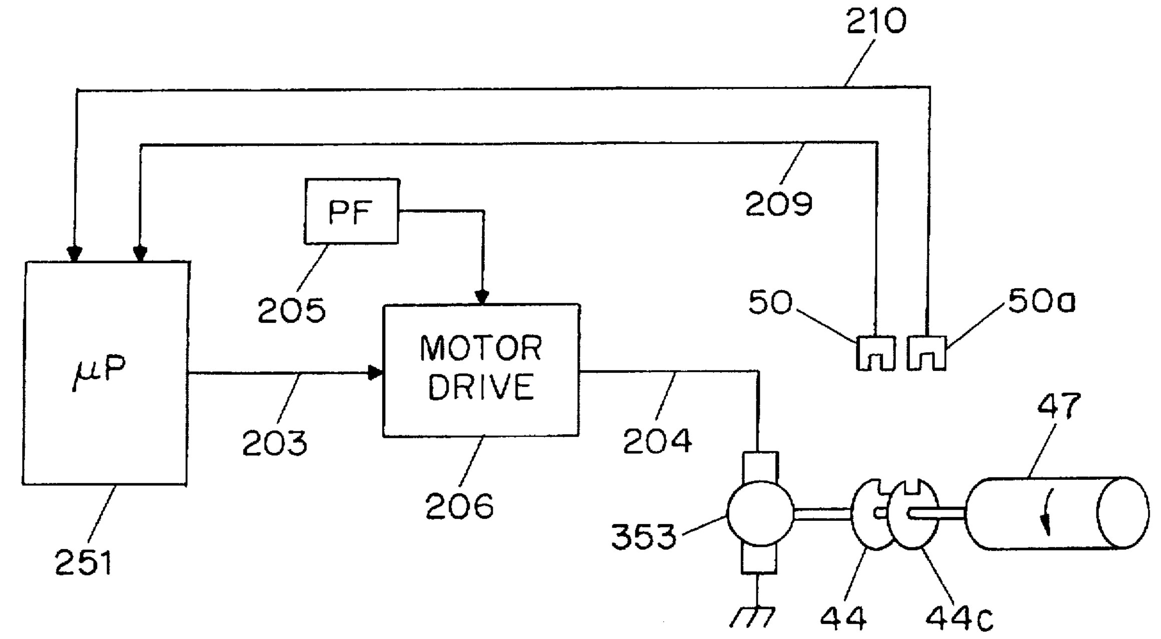
FIG. 10 shows a functional block diagram view of the microprocessor and motor drive.
Figure 11:
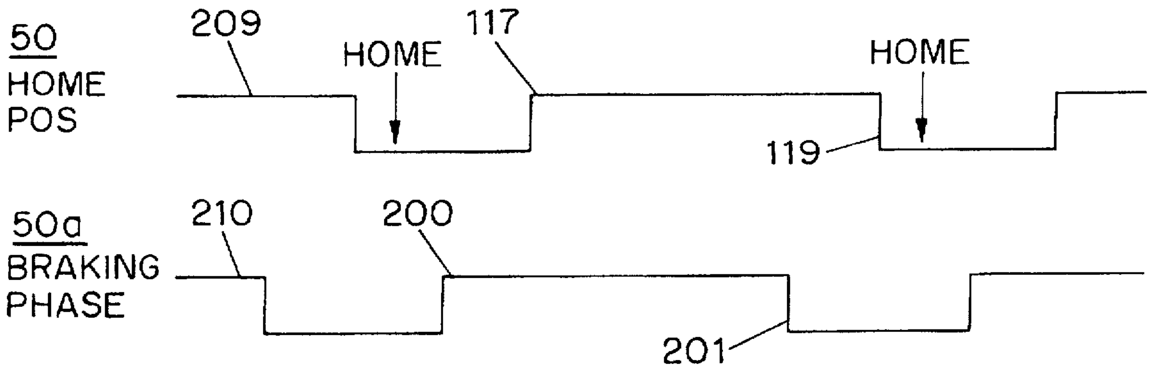
FIG. 11 is a timing diagram showing signals from rotor sensors of FIG. 10.

FIG. 10 shows a functional block diagram view of the microprocessor 251 and motor drive circuitry 206, along with motor 353 and rotor 47. Two rotor position sensors 50, 50a are provided, again as set forth in the above-mentioned U.S. application Ser. No. 08/446,218. Even with both sensors, the signals of which are shown in FIG. 11, it is not possible to distinguish between a home position that precedes the printing of postage, and a home position that follows the printing of postage.

The normal sequence of events for a postage printing cycle is as follows. First, the postage meter (also called a franking machine) is in an idle state. The user may request that the meter be set for a particular amount of postage value. Then, a mail piece 46 such as an envelope enters the postage meter, as shown in FIG. 1. Next, the mail piece strikes the letter lever 201 as shown in FIG. 3. The letter sensor 200 provides an output to the processor 251, as shown in FIG. 4. The processor 251 "books the postage", meaning that it updates accounting registers 404 (FIG. 4) such as an ascending register or descending register, to reflect the postage being printed. The processor 251 also actuates the motor drive 206 (FIG. 10) which starts the 20 motor 353. Then, as shown in FIG. 6, the motor 353 causes the worm gear 354 to rotate. As shown in FIG. 5, the rotation of gear 354 causes the worm wheel 415 and the rotor 47 to rotate.

When the braking sensor 50a (FIGS. 11, 10) senses that the rotor has rotated almost all the way, the processor 251 slows down the motor 353. When the sensor 50 indicates that the rotor 47 is home, the processor 251 stops the motor 353 and the rotor 47.

The important issue addressed by the invention is the possibility of loss of electrical power at any of numerous unpredictable times during the above-described sequence of events. It is desirable to provide for a single loss and restoration of power, and to provide for the possibility of numerous losses and restorations of power. When the processor is powered up, the most common everyday event is that the processor would find itself at an idle time. Stated differently, it is anticipated that most often when the meter is powered down and powered up, the rotor would be in the home position with no particular activity taking place other than a background idle process. However, it has to be assumed that sometimes when the meter is powered up, this will happen when the meter had previously been in the middle of printing postage. The question then arises, is it possible, even after the loss and restoration of power, to distinguish between a rotor that is in its home position because it has not yet printed postage (but needs to do so) and a rotor that is in its home position because the printing of postage has been completed. Similarly the question arises whether it is possible, even after the loss and restoration of power, to distinguish between accounting registers that are quiescent because they have not yet had a postage amount booked, and registers that are quiescent because the booking of postage has been completed.

As described in the background section of the specification, a prior-art approach to all of these questions is simply to attempt to provide a power supply that will continue to provide power to the postage meter, even if external power is cut off, for a long enough time to ensure that the entire process of updating the accounting registers can be completed. This then holds out the hope that it would never be necessary to wonder whether the booking process has not yet started or whether it has already finished. But as mentioned above, one skilled in the art can generally devise sequences of intermittent power loss, or partial power loss, that pose a substantial risk that such a reserve power supply would not permit disambiguation of the pre-booking and post-booking conditions of the accounting registers.

Yet another approach to the possibility of loss of power is that set forth in a copending patent application entitled Computer Power Fail Return Loop, U.S. application Ser. No. 07/738,345, filed Jul. 31, 1991, and assigned to the same assignee as that of the present application, which is incorporated herein by reference.

With reference to FIG. 12, the technique according to the invention will now be described. The stored program of the processor 251 defines storage locations 402 and 403, which are state variables. Variable 402, called "booking not done", represents the state in which it is necessary for booking to take place, but the booking has not yet been completed. Variable 403, called "booking not confirmed", represents the state in which it is necessary that the rotor be rotated one time to print postage, but the rotor rotation (called the "rotor task") has not been completed. The sequence of events in the normal printing of postage will now be described in detail, with particular reference to FIG. 12.

First, the postage meter is in an idle state, as shown in the first row of FIG. 12. The state variables 402, 403 are both cleared (false) and the rotor 47 is home. Then, a mail piece 46 such as an envelope enters the postage meter, striking the letter lever 201, triggering the letter sensor 200. This provides an output to the processor 251, which is preferably an interrupt.

The main consequence of this is that booking is going to have to take place, and that the rotor is going to have to rotate. This is represented by row 2 of FIG. 12.

Next, the processor begins "booking the postage". The accounting registers preferably store not only the current ascending register and/or descending register contents, but also historical data that will permit reconstructing the meter contents in the event of malfunction or tampering. The accounting registers may be battery-backed static RAM, or EEPROM, or some other nonvolatile technology. The first event in the booking of postage is the setting of the flag or state variable 402, indicating that booking is not yet done. This is shown in row 3. The processor 251 continues with the task of "booking the postage", meaning that it updates accounting registers 404 (FIG. 4) such as the ascending register and/or descending register, to reflect the postage being printed. In addition, the processor sets the flag or state variable 403, indicating that booking is not yet confirmed, as shown in row 3.

In row 4, the processor 251 actuates the motor drive 206 (FIG. 10) which starts the motor 353, as a result of which the "rotor home" sensor 50 no longer shows the rotor to be at home, also shown in row 4.

Eventually the rotor again reaches its home (or "base") position as shown in row 5. When the sensor 50 indicates that the rotor 47 is home, the processor 251 stops the motor 353 and the rotor 47. The "booking not completed" flag 403 is cleared, as shown in row 6.

Figure 13:
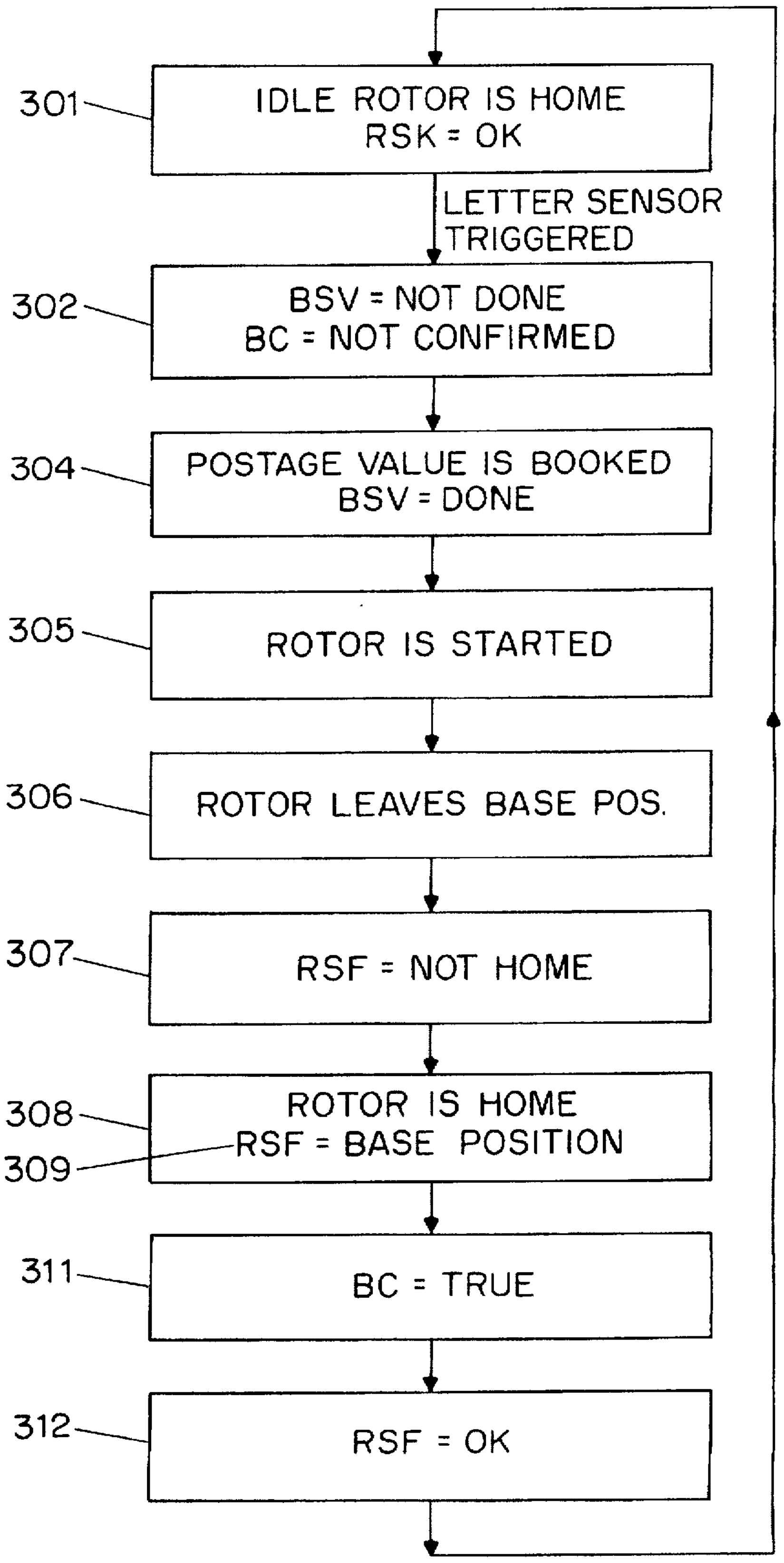
FIG. 13 is a flow diagram showing changes of state in a second embodiment of the invention.

Turning now to FIG. 13, the franking process is shown pictorially. Most of the time the postage meter is in its idle state 301. A rotor status flag has a status of "OK"

If a mail piece (envelope or postage label or post card) enters the postage meter, it triggers the letter sensor as shown at 302. This causes software to set the booking state variable to "not done", and in this embodiment the "booking confirmed" state variable is set to "not confirmed". The actual booking of postage value (based on the amount of postage that is to be printed on the mail piece) takes place in box 304. When the booking of postage value is completed, then the state variable "booking state" is set to "done".

Those skilled in the art will appreciate that there can be a plurality of "booking state" variables, each representing a sub-task in the overall task of booking the postage. If so, then each such variable is set prior to the beginning of its subtask, and is cleared after its subtask is cleared. For simplicity of description, the term "booking state variable" may be used herein to refer to more than one if more than one is used.

When all of the tasks and subtasks of the booking of postage are finished, then control passes to box 305, in which software directs the rotor to start. (In a preferred embodiment, a software module called the "rotor task" is called, and is commanded to enter the "franking" state.) The rotor leaves its home or "base position" location (shown at 306), and rotates. The departure from home is sensed by the rotor home sensor.

During this time the rotor is not at home and its state is reported as "not home", as at box 307.

Eventually (assuming no loss of power or mechanical malfunction) the rotor again reaches its home or base position (at 308). The rotor position is reported to be in a state of "base position", and this status is made available in software (at 309). Next, the "booking not confirmed" status variable is cleared (box 311), and thus by definition the rotor status is "ok" (box 312). The system is said once again to be at idle (box 301).

Those skilled in the art will appreciate that it is workable to set the flag (status variable) 402 (booking not done) first, or to set the flag (status variable) 403 (booking not confirmed) first, if desired, although it is thought preferable to set the flag 402 first. Likewise it is thought preferable to require that the booking task be completed before the rotor task begins, or alternatively the tasks could take place concurrently as tasks in a time-shared operating system. Finally it would be possible to require that the rotor task be completed before the booking task begins. In any of these cases the state variables or flags 402, 403 serve the same important purpose, namely permitting recovering from power failure as will now be described.

Figure 14:
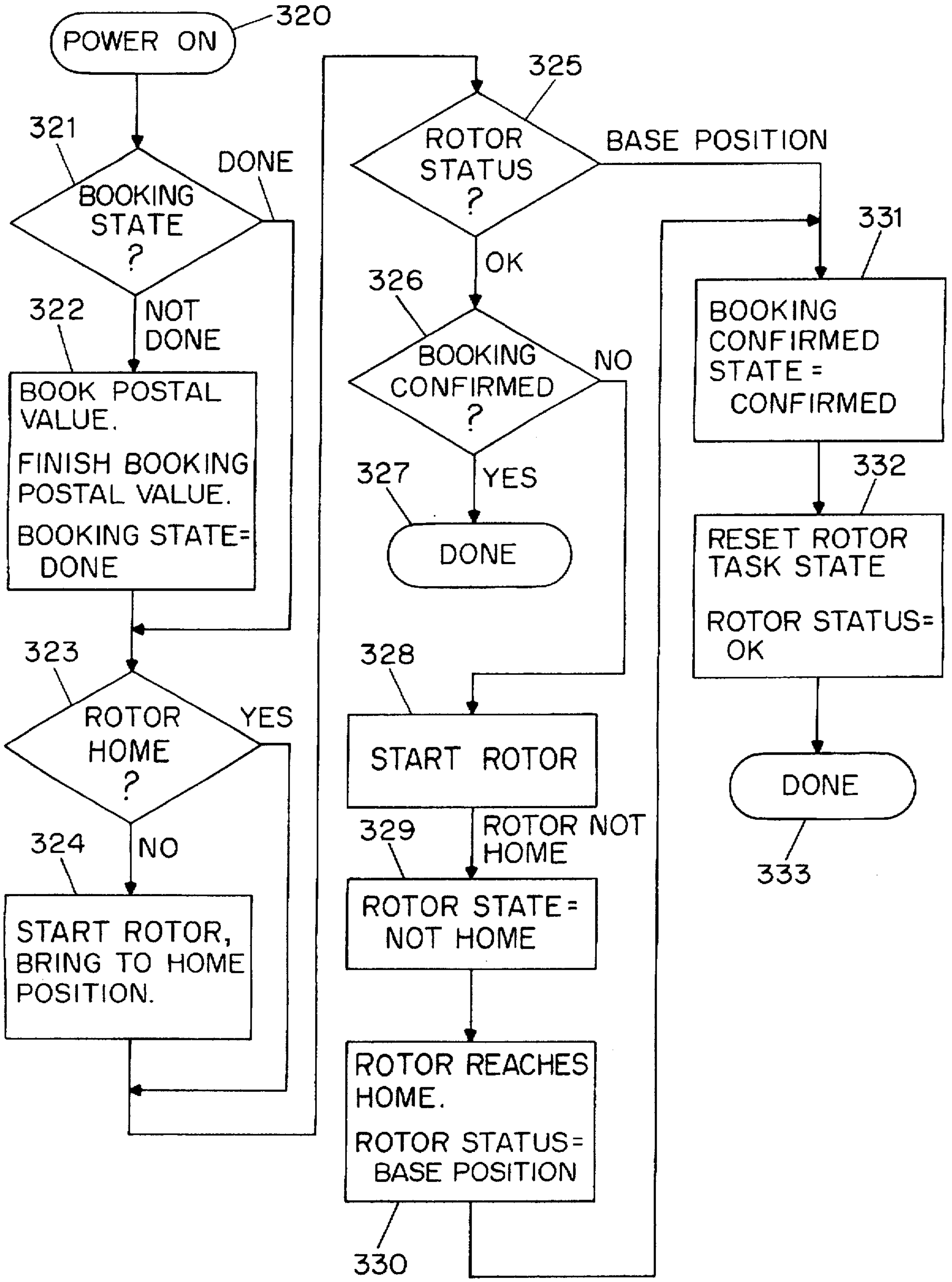
FIG. 14 is a flow diagram portraying recovery when power is reapplied after a loss of power.

When the processor is powered up (see FIG. 14, box 321), a check is made to see if the "booking not done" flag is set. If so, then booking is completed (box 322). A check is also made to see if the rotor is not at home (box 323). If so, then the rotor task is started and the motor started (box 324).

Yet another step performed during the power-on procedure is to test the rotor's status (box 325). If the rotor status is "base position" then the rotor must have just finished printing postage. All that remains is to clear the "booking not confirmed" flag (box 331), clear the rotor state to "ok", and finish. (This is the counterpart of boxes 310–312 in FIG. 13.)

Returning to FIG. 14, box 325, the other outcome is that the rotor status is "ok". If so, the "booking confirmed" status is checked at 326. If the status is that booking is confirmed, then there is nothing further to be done and the power-on initialization is complete. If booking is not confirmed, then control passes to box 328. The rotor is started, and the rotor state is "not at home". Eventually the rotor reaches home again, and the rotor state is reported as "base position". Control then passes to box 331, as discussed above. The "booking not completed" flag is cleared at box 331. The rotor state is set to "ok", and initialization is done.

Those skilled in the art will appreciate how the use of these flags reduces to an absolute minimum the periods of time during which loss of power could result in ambiguous situations. In particular, recall that the preferred embodiment has the entire accounting register booking activity finished prior to the start of the motor for the print rotor. The accounting activity can thus take place relatively quickly, in a way that is unaffected by now long the rotor rotation might take. As a result, the power supply electrolytic capacitors need not be oversized to provide tens or hundreds of milliseconds of power, but need only be large enough to smooth the power and to provide power during the quite brief times when the state variables need to be set and cleared. This saves weight and cost and space in the power supply, but much more importantly it makes the postage meter robust against intermittent power outages, partial power losses, and the like, since even a repeated power loss which repeatedly interrupts the booking task or repeatedly interrupts the rotor task will not disrupt the state variables.

The invention has been described with respect to several embodiments, but those skilled in the art will have no difficulty devising obvious variations and changes to the embodiments set forth, without deviating in any way from the invention, which is defined by the claims which follow.

We claim:

1. A postage meter having a processor executing a stored program, the meter having a print rotor for printing postage value, the rotor rotation defining a home rotor position, the rotor operatively coupled with a motor startable and stoppable by the processor, the meter further comprising a mail piece sensor, the meter further comprising a rotor home position sensor, the meter further comprising a nonvolatile memory, the nonvolatile memory comprising an accounting register indicative of the printing of postage value, the nonvolatile memory further comprising first and second state storage locations, said meter further comprising:

- means responsive to actuation of the mail piece sensor for setting the first state storage location and for commencing updating of the accounting register after the first state storage location has been set; and for setting the second state storage location and for turning on the motor after the second state storage location has been set;
- means responsive to the rotor home position sensor indicating arrival of the rotor at the home position for turning off the motor and clearing the second state storage location;
- means responsive to completion of the updating of the accounting register for clearing the first state storage location; and
- means responsive to the application of electric power to the meter, to the condition of the first state storage location, to the condition of the second state storage location, and to the condition of the rotor home position sensor, such that:
  - in the event the rotor is in the home position and the second state storage location is clear, the meter enters a quiet state;
  - in the event the first state storage location is set, the completes the updating of the accounting register and, after completing the updating of the accounting register, the first state storage location is cleared and the motor is started;
  - in the event the rotor is in its home position and the second state storage location is set, the motor is started; and
  - in the event the rotor is not in its home position, the motor is started.

2. A method of operation of a postage meter, the postage meter having a processor executing a stored program, the meter having a print rotor for printing postage value, the rotor rotation defining a home rotor position, the rotor operatively coupled with a motor startable and stoppable by the processor, the meter further comprising a mail piece sensor, the meter further comprising a rotor home position sensor, the meter further comprising a nonvolatile memory, the nonvolatile memory comprising an accounting register indicative of the printing of postage value, the nonvolatile memory further comprising first and second state storage locations, the method comprising the steps of:

- in response to actuation of the mail piece sensor:
  - setting the first state storage location;
  - commencing updating of the accounting register after the first state storage location has been set;
  - setting the second state storage location after the first state storage location has been set;
  - starting the motor after the second state storage location has been set;
  - responding to the rotor home position sensor indicating arrival of the rotor at the home position by turning off the motor and clearing the second state storage location; and
  - responding to completion of the updating of the accounting register by clearing the first state storage location.

3. A method of operation of a postage meter, the postage meter having a processor executing a stored program, the meter having a print rotor for printing postage value, the rotor rotation defining a home rotor position, the rotor operatively coupled with a motor startable and stoppable by the processor, the meter further comprising a mail piece sensor, the meter further comprising a rotor home position sensor, the meter further comprising a nonvolatile memory, the nonvolatile memory comprising an accounting register indicative of the printing of postage value, the nonvolatile memory further comprising first and second state storage locations, the method comprising the steps of:

- in response to actuation of the mail piece sensor:
  - setting the first state storage location;
  - commencing updating of the accounting register after the first state storage location has been set;
- in response to the loss and restoration of electric power, performing the steps of:
  - inspecting the condition of the first state storage location,
  - in the event the first state storage location is set, completing the updating of the accounting register and, after completing the updating of the accounting register, resetting the first state storage location.

4. A postage meter having a processor executing a stored program, the meter having a print rotor for printing postage value, the rotor rotation defining a home rotor position, the rotor operatively coupled with a motor startable and stoppable by the processor, the meter further comprising a mail piece sensor, the meter further comprising a rotor home position sensor, the meter further comprising a nonvolatile memory, the nonvolatile memory comprising an accounting register indicative of the printing of postage value, the nonvolatile memory further comprising first and second state storage locations, said meter further comprising:

means responsive to actuation of the mail piece sensor for setting the first state storage location and for commencing updating of the accounting register after the first state storage location has been set; and for setting the second state storage location and for turning on the motor after the second state storage location has been set;

means responsive to rotor home position sensor indicating arrival of the rotor at the home position for turning off the motor and clearing the second state storage location; and means responsive to completion of the updating of the accounting register for clearing the first state storage location.

5. A method of operation of a postage meter, the postage meter having a processor executing a stored program, the meter having a print rotor for printing postage value, said print rotor capable of rotation, the rotor rotation defining a home rotor position, the rotor operatively coupled with a motor startable and stoppable by the processor, the meter further comprising a mail piece sensor, the meter further comprising a rotor home position sensor, the meter further comprising a nonvolatile memory, the nonvolatile memory comprising an accounting register indicative of the printing of postage value, the nonvolatile memory further comprising first and second state storage locations, the method comprising the steps of:

in response to actuation of the mail piece sensor:

setting the first state storage location;

commencing updating of the accounting register after the first state storage location has been set;

setting the second state storage location;

starting the motor after the second state storage location has been set;

responding to the rotor home position sensor indicating arrival of the rotor at the home position by turning off the motor and clearing the second state storage location; and responding to completion of the updating of the accounting register by clearing the first state storage location.

* * * * *